United States Patent [19]

Park

[11] Patent Number: 4,661,302
[45] Date of Patent: Apr. 28, 1987

[54] EXPANDABLE POLYMERIC COMPOSITION AND METHOD

[75] Inventor: Chung P. Park, Pickerington, Ohio

[73] Assignee: The Dow Chemical Company, Midland, Mich.

[21] Appl. No.: 835,133

[22] Filed: Apr. 7, 1986

[51] Int. Cl.$^4$ .............................. C08J 9/14; C08J 9/22
[52] U.S. Cl. ..................................... 264/53; 264/55; 264/DIG. 5; 521/79; 521/81; 521/88; 521/98; 521/139; 521/910; 521/85
[58] Field of Search .................... 521/79, 81, 139, 85; 264/55, 53, DIG. 5

[56] References Cited

U.S. PATENT DOCUMENTS

| | | | |
|---|---|---|---|
| 4,065,401 | 12/1977 | Cohnen et al. | 521/180 |
| 4,097,425 | 6/1978 | Niznik | 521/139 |
| 4,128,689 | 12/1978 | Heaps | 521/59 |
| 4,360,486 | 11/1982 | Di Biasi et al. | 521/139 |
| 4,579,710 | 4/1986 | Krutchen et al. | 521/79 |
| 4,579,873 | 4/1986 | Krutchen et al. | 521/79 |

*Primary Examiner*—Morton Foelak

[57] ABSTRACT

An expandable alkenyl aromatic polymer composition and methods of preparation are provided. The composition is admixed with a volatile blowing agent and an expansion aid which includes a polyphenylene ether. The composition may be extruded and then expanded by exposure to steam or hot air or may be impregnated with blowing agent and then expanded.

9 Claims, 2 Drawing Figures

EXPANDABLE POLYMERIC COMPOSITION AND METHOD

BACKGROUND OF THE INVENTION

This invention relates to an expandable polymeric composition of matter and method of preparation, and more particularly to an expandable alkenyl aromatic polymer composition with a volatile blowing agent and an expansion aid.

Alkenyl aromatic polymer foams such as polystyrene foams have found a wide variety of usages including insulation, cushion packaging, and the formation of molded articles such as cups, trays, and the like. When utilized as an insulating material, especially as loose fill particles, or cushion packaging material, expansion of the polystyrene foam to very low densities is quite desirable.

Steam expansion is a widely applied technology in preparing a styrenic polymer foam. Atmospheric steam (i.e., steam at atmospheric pressure) is often used to expand polystyrene resins. Both on-line and off-line expansion techniques have been utilized. In expanding polystyrene foams, it is desirable to have rapid expansion to low densities. This reduces energy and materials costs. Also desirable is the ability to expand the foam over a range of operable temperatures rather than in only a narrow temperature range because of difficulties in maintaining optimum temperatures during the entire expansion cycle.

In the past, previous attempts have been made to utilize plasticizers and/or plasticizing blowing agents in polystyrene foams to aid in expansion, particularly where very low densities are desired. Such plasticizers improve the speed of expansion but have been found to have an adverse effect on the final foam properties, and in some instances have resulted in a permanent softening of the foam.

Cross-linking of the foam during expansion to stabilize cell formation has also been attempted. However, the use of crosslinking agents may be carefully controlled as insufficient crosslinking does not produce the desired stabilization and over crosslinking makes processing difficult. Moreover, crosslinking of such foams has been determined to make reprocessing of the foam scraps difficult.

Accordingly, the need still exists in the art for an alkenyl aromatic polymer foam, which when exposed to steam or hot air expands rapidly to very low densities. Additionally, the need exists for such a foam to be easily reprocessable to enable savings in materials costs.

SUMMARY OF THE INVENTION

The present invention meets that need by providing an expandable polymeric composition and process of preparation which expands rapidly to very low densities. According to one aspect of the invention, the expandable composition comprises at least 50% by weight of an alkenyl aromatic polymer together with a volatile blowing agent and from about 0.06% to about 15.0% by weight of an expansion aid comprising a polyphenylene ether. The polyphenylene ether expansion aid is compatible with alkenyl aromatic polymers such as polystyrene and additionally acts to stabilize the extension of the polymer melt during expansion.

In a preferred embodiment, the expansion aid also includes from about 0.11% to about 27.5% by weight of a rubber-containing polystyrene composition and from about 0.03% to about 7.5% by weight of an aromatic phosphate. The rubber-containing polystyrene, which may be a high impact polystyrene, has been modified with rubber additives grafted onto the polystyrene backbone structure or block copolymerized with the polystyrene. Such rubber-containing polystyrenes have been found to have a plasticizing effect on the primary alkenyl aromatic polymer constitutent of the composition. The aromatic phosphate also has been found to have a significant plasticizing effect on the primary alkenyl aromatic polymer constituent of the composition.

The combined effects of these expansion aids serve to modify the glass transition temperature (Tg) of the primary alkenyl aromatic polymer constituent of the composition and widen the range of operable temperatures for foam expansion. Thus, the composition of the present invention can be expanded under conditions where an alkenyl aromatic polymer alone cannot be successfully expanded. The broad range of operable expansion temperatures, coupled with the combination of desirable effects of the expansion aid provides for rapid expansion of alkenyl aromatic polymer resins to very low densities.

A very low density foam may be produced in accordance with the present invention by melt processing under pressure at least 50% by weight of an alkenyl aromatic polymer with a volatile blowing agent and the expansion aid to form a flowable admixture. The admixture is then extruded through a die to a zone of lower pressure where the blowing agent is activated to expand the composition to a cellular structure. This cellular foam is then exposed to atmospheric stream or hot air at a temperature of between about 80° to about 115° C. to cause further expansion of the foam to even lower densities. The exposure of the admixture to lower pressure and to steam or hot air preferably occurs sequentially after a period of aging the foam following its initial expansion. However, the process can take place substantially simultaneously in an on-line procedure whereby the extruded foam is immediately exposed to steam or hot air.

In an alternative process for preparing the expandable composition of the present invention, a very low density foam is prepared by impregnating a granular alkenyl aromatic polymer, which has been blended with the expansion aid, with a volatile blowing agent. The polymer impregnated with blowing agent is then heated to activate the blowing agent and expand the composition. Steam or hot air may be used to provide the heat for this initial expansion. Preferably, the composition is subjected to one or more expansion cycles in the presence of steam or hot air at a temperature of between about 80° to about 115° C. to produce very low density foams having final densities in the range of from about 2.0 to about 16.0 kg/m$^3$.

Accordingly, it is an object of the present invention to provide an expandable alkenyl aromatic polymer composition and method of preparation which provides rapid expansion of the composition to very low densities. This and other objects and advantages of the invention will become apparent from the following detailed description, the accompanying drawings, and the appended claims.

DETAILED DESCRIPTION OF THE PREFERRED EMBODIMENTS

The expandable polymer composition of the present invention includes at least 50% by weight of an alkenyl aromatic polymer resin. Preferably, the resin has a weight average molecular weight of between about 100,000 to about 300,000. Such molecular weight may be determined by gel permeation chromatography (GPC), for example.

By the term "alkenyl aromatic polymer" resin, is meant a solid polymer of one or more polymerizable alkenyl aromatic compounds and, optionally, at least one copolymerizable monomer. The polymer or copolymer comprises, in polymerized form, at least 70% by weight of polymer units derived from at least one alkenyl aromatic monomer having the general formula:

where Ar represents an aromatic hydrocarbon radical, or an aromatic halohydrocarbon radical of the benzene series, and R is hydrogen, a methyl group, or an ethyl group. Examples of such alkenyl aromatic polymers are the solid homopolymers of styrene, α-methylstyrene, o-methylstyrene, m-methylstyrene, p-methylstyrene, ar-ethylstyrene, ar-vinylxylene, ar-chlorostyrene, ar-bromostyrene, vinyl toluene, or the solid copolymers of one or more of such alkenyl aromatic compounds with other copolymerizable monomers such as acrylonitrile, anhydrides of maleic or itaconic acids, acrylic or methacrylic acid, or rubber-reinforced (either synthetic or natural) styrene polymers, and the like.

Blowing agents useful in the practice of the present invention are well known and may comprise solids or liquids which decompose (volatilize) into gaseous products at extrusion temperatures. A preferred class of blowing agents includes halogenated hydrocarbon compounds having from 1 to 5 carbon atoms, hydrocarbon compounds having from 1 to 5 carbon atoms, low molecular weight alcohols, and mixtures thereof. When such compounds are used as the blowing agent, there can be from about 0.013 to about 0.50 gram mole, and preferably 0.04 to 0.30 gram mole of such blowing agent per 100 grams of alkenyl aromatic polymer resin in the flowable gel or admixture. Especially preferred blowing agents include dichlorodifluoromethane (FC-12), trichloromonofluoromethane (FC-11), n-pentane, isopentane, and mixtures thereof.

As the expansion aid used in the practice of the present invention, such expansion aid comprises from about 0.06% to about 15.0% by weight of a polyphenylene ether, more preferably from about 0.09% to about 6.0% by weight, and most preferably from about 0.15% to about 1.5% by weight.

Polyphenylene ethers used in the practice of the present invention incude those having the repeating structural unit of the formula:

where the oxygen ether atom of one unit is connected to the benzene nucleus of the next adjoining unit, n is a positive integer having a value of 100 or greater, and each R may be hydrogen, halogen, hydrocarbon radicals free of a tertiary α-carbon atom, halohydrocarbon radicals having at least two carbon atoms between the halogen atom and phenyl nucleus and being free of a tertiary α-carbon atom, and halohydrocarbonoxy radicals having at least two carbon atoms between the halogen atom and phenyl nucleus and being free of a tertiary α-carbon atom. Most preferred is poly(2,6-dimethy-1,4-phenylene oxide). Additionally, graft copolymers of an alkenyl aromatic resin and a polyphenylene ether may be utilized. Examples of such graft copolymers are described in Izawa et al, U.S. Pat. No. 3,929,931. Accordingly, the term polyphenylene ether as used in this specification encompasses such graft copolymers.

The polyphenylene ether expansion aid may be readily blended with the alkenyl aromatic polymer resin and is compatible and miscible therewith. Preferably, the polyphenylene ether expansion aid is fed directly into the extruder and melt processed with the alkenyl aromatic polymer resin without the need for any additional mixing apparatus.

In a preferred embodiment of the invention, the expansion aid also includes a rubber-containing polystyrene composition such as high impact polystyrene (hereinafter sometimes HIPS) and an aromatic phosphate such as triphenyl phosphate (hereinafter sometimes TPP). Suitable rubber-containing polystyrenes include not only the conventional high impact polystyrene based on polybutadiene but also includes styrene-butadiene block copolymers such as those disclosed in Kambour, U.S. Pat. No. 3,639,508, for example. Also included are polystyrenes modified with so-called EPDM rubbers disclosed in Cooper et al., U.S. Pat. No. 3,943,191. Other suitable aromatic phosphates, such as trimesityl phosphate, are described in Cooper, U.S. Pat. No. 3,883,613.

The rubber-containing polystyrene composition is present in an amount of between about 0.11% to about 27.5% by weight, more preferably from about 0.17% to about 11.0% by weight, and most preferably from about 0.28% to about 2.75% by weight. The aromatic phosphate is present in an amount of between 0.03% to about 7.5% by weight, more preferably from about 0.05% to about 3.0% by weight, and most preferably from about 0.08% to about 0.75% by weight. Blends of polyphenylene ether, high impact polystyrene (HIPS), and/or triphenyl phosphate (TPP) are readily commercially available in a variety of resins marketed under the trademark NORYL by the General Electric Company and the trademark PREVEX by Borg-Warner Chemicals, Inc.

The preferred ratio of polyphenylene ether to HIPS to TPP in the expansion aid is 0.30 to 0.55 to 0.15, respectively. An example of a commercial resin having the preferred range of polyphenylene ether, HIPS, and TPP is NORYL PN-215, available from the General Electric Company. Preferably, this resin is utilized as an expansion aid in an amount of from about 0.2% to about 50% by weight, more preferably from about 0.3% to about 20.0% by weight, and most preferably from about 0.5% to about 5.0% by weight of the alkenyl aromatic polymer constituent.

The polyphenylene ether expansion aid is believed to stabilize the extention of the alkenyl aromatic polymer melt with its own stiff polymeric chains near the glass transition temperature of the alkenyl aromatic resin. Such stabilization is especially desirable for the relatively low molecular weight resins utilized in the practice of the present invention.

The optional rubber-containing polystyrene composition and aromatic phosphate additives in the expansion aid have a plasticizing effect on the alkenyl aromatic resin, thus effectively lowering the glass transition temperature of the resin into an optimal 80°–115° C. range for processing. The combination of effects of the individual components of the expansion aid are believed to broaden the transition temperature of the polymer melt, thereby widening the operable temperature window for expansion.

The expandable composition of the present invention expands rapidly in steam or when exposed to hot air to produce very low density foams having densities of between about 2 to about 200 Kg/m$^3$ and expansion ratios of from about 5 to about 600. This is to be contrasted with typical polystyrene foams which cannot be expanded to such low densities or high expansion ratios without splitting or cracking.

Moreover, the expandable composition of the present invention is advantageous over the use of crosslinking agents in foam expansion. The composition of the present invention avoids the processing difficulties engendered by the use of crosslinking agents such as over-crosslinking and produces a foam which is reprocessable so that materials cost savings can be realized with scrap recycle.

As is conventional, finely divided solid materials such as talc, calcium silicate, barium or zinc stearate, and the like can advantageously be incorporated with the polymer gel prior to expansion. Such finely divided materials aid in controlling the size of the cells and may be employed in amounts up to five percent by weight of the polymer. Fillers, pigments, lubricants, wetting agents, and the like well known in the art can also be incorporated as desired.

In order that the invention may be readily more understood, reference is made to the following examples, which are intended to illustrate the invention, but are not to be taken as limiting the scope thereof.

EXAMPLE 1

The apparatus used in this example is a 1¼" screw type extruder having two additional zones for mixing and cooling at the end of usual sequential zones for feeding, melting, and metering. An opening for blowing agent injection is provided on the extruder barrel between the metering and mixing zones. At the end of the cooling zone, there is attached a die orifice having an opening of rectangular shape. The height of the opening, called die gap hereinafter, is adjustable while its width is fixed at 6.35 mm.

A granular polystyrene having a weight average molecular weight of about 200,000 was dry blended with a predetermined amount of an expansion aid which comprised granular NORYL PN-215 resin produced by General Electric Company. A small amount, 0.05 pph each, of barium stearate and talc were mixed in the polymer granules by using a small amount (0.1 pph) of wetting agent. The wetting agent was a 50/50 by weight mixture of sucrose acetate isobutylate and dioctyladipate. The mixture was fed into the extruder at an essentially uniform rate of about 4.54 kg (10 pounds) per hour. A 70/30 by weight mixture of dichlorodifluoromethane (FC-12) and trichloromonofluoromethane (FC-11) was injected into the extruder at an aimed rate of about 0.69 kg (1.52 pounds) per hour. The extruder zones were maintained at 180°, 200° and 195° C. for feeding, melting and metering, and mixing zone, respectively. The temperature of the cooling zone was adjusted so that the gel cooled down to a uniform temperature of about 142° C. The effects of the die opening on the die pressure, foam cross-sectional size and foam appearance were investigated and the data were recorded. Density, cell size and open cell content of the foams were determined later. Secondary expansions by steam and also by air were conducted with foams aged for one week and six months, respectively.

Both secondary expansions in steam and in air employed foam slugs of about 0.64 cm thickness sliced out of the strands and aged for one day at ambient temperature. The weight and volume of each foam specimen were measured prior to secondary expansions. Foam specimens were exposed to atmospheric steam of about 100° C. for various lengths of time from 10 seconds to 2 hours in order to determine the rate and also degree of expansions. Foam which had undergone more than a 70 expansion ratio shrank when taken out of steam but recovered to the final steady state volume in about two days. In hot air expansion tests, foam specimens were exposed to hot air of a predetermined temperature for one hour. The final foam volumes were measured after the foam specimens cooled down to ambient temperature.

Table IA shows the extrusion foamability of the composition of the present invention. Addition of the expansion aid slightly increases die pressure and results in an excellent quality foam. The cell size and foam cross-sectional size become larger. At a higher level of expansion aid, (i.e., up to the 20 percent level), similar improvements in foam extrusion processability are obtained. For the given blowing agent type and level, the threshold die pressure for prefoaming is about 40 kg/cm$^2$. At a 50% expansion aid level the foam strand becomes unstable at all die gaps indicating that an overdosage of expansion aid has a detrimental effect on foam extrusion. All foams made during the tests of this example are of essentially closed cell structure having very low open cells.

Figure 1:
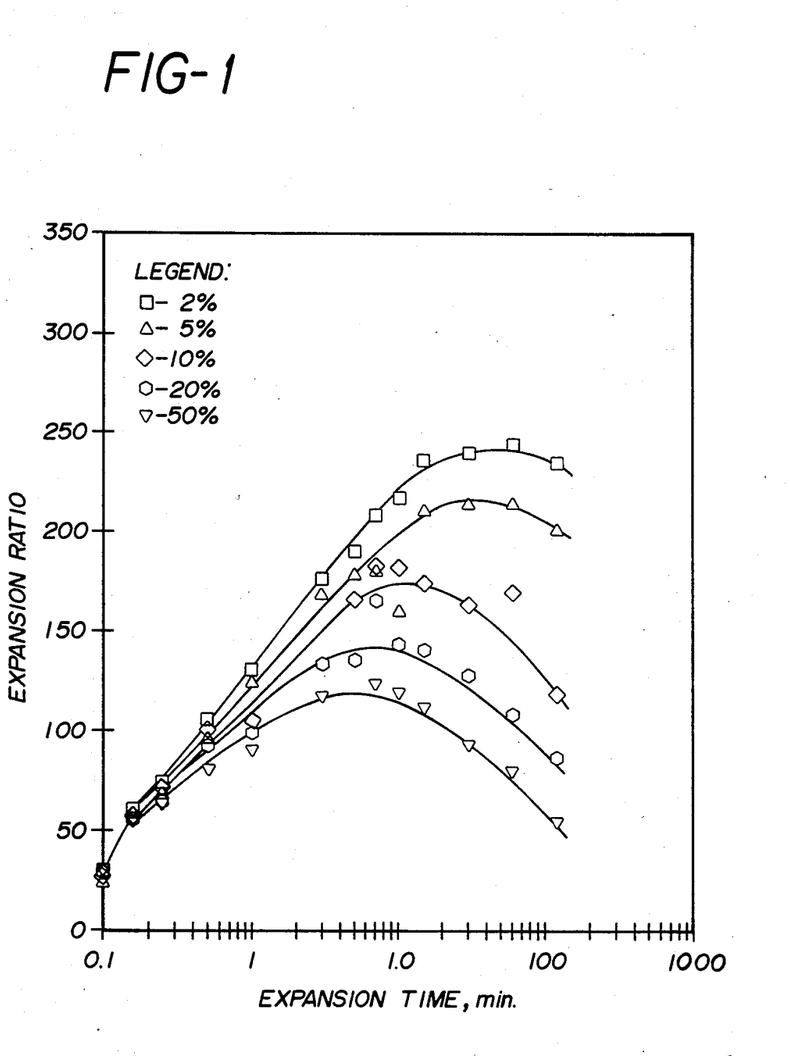
FIG. 1 is a graph comparing the expansion ratio versus expansion time for polystyrene foams having differing levels of polphenylene ether expansion aid based on data set forth in Example 1.

The more pronounced effect of the expansion aid is seen from secondary expansion data as shown in Table IB and FIG. 1. The foams illustrated in FIG. 1 had been aged approximately one week prior to expansion. The formulation containing 2% expansion aid expanded to over 200 expansion ratios within 10 minutes, eventually reaching a maximum of 243 expansion ratios in one hour.

TABLE IA

| Test No. | Expansion Aid Level (1) | BA Level (2) | Die Gap (3) | Die Pressure (4) | Extruder Pressure (5) | Foam Thick (6) | Foam Width (7) | Foam Density (8) | Cell Size (9) | Open Cell (10) | Prefoaming (11) | Flow Stability (12) |
|---|---|---|---|---|---|---|---|---|---|---|---|---|
| 1 | 2 | 15.3 | 0.76 | 45 | 67 | 1.27 | 3.35 | 38.9 | 0.32 | 0.9 | N | S |
| 2 | 5 | 15.2 | 0.76 | 46 | 70 | 1.24 | 3.23 | 36.5 | 0.37 | 0 | N | S |
|   |   |   | 0.89 | 40 | 63 | 1.52 | 3.38 | 38.4 | 0.38 | 0.9 | N | S |
|   |   |   | 1.02 | 36 | 60 | 1.75 | 3.25 | 37.6 | 0.44 | 0.9 | Y | U |
| 3 | 10 | 15.0 | 0.76 | 46 | 69 | 1.22 | 3.30 | 35.2 | 0.39 | 0 | N | S |
|   |   |   | 0.89 | 40 | 63 | 1.45 | 3.33 | 33.8 | 0.43 | 0 | N | S |
|   |   |   | 1.02 | 35 | 56 | 1.45 | 3.33 | 34.4 | 0.42 | 1.6 | V | S |
| 4 | 20 | 15.1 | 0.76 | 49 | 74 | 1.19 | 3.28 | 36.0 | 0.33 | 0.1 | N | U |
|   |   |   | 0.89 | 44 | 70 | 1.40 | 3.30 | 36.0 | 0.33 | 0.5 | N | U |
|   |   |   | 1.02 | 39 | 67 | 1.50 | 3.28 | 33.5 | 0.37 | 1.0 | N | S |
|   |   |   | 1.40 | ND | ND | 1.80 | 3.20 | 35.6 | 0.39 | 1.0 | Y | S |
| 5 | 50 | 15.2 | 0.76 | 46 | 81 | 1.09 | 3.23 | 33.8 | 0.32 | 0.6 | N | U |
|   |   |   | 0.89 | ND | ND | 1.12 | 3.28 | 35.9 | 0.36 | 0 | N | U |
|   |   |   | 1.02 | ND | ND | 1.24 | 3.28 | 33.8 | 0.35 | 0.1 | N | U |
|   |   |   | 1.14 | ND | ND | 1.42 | 3.30 | 35.2 | 0.32 | 0.6 | V | U |

Notes
ND = not determined
(1) = parts of NORYL FN-215 made by General Electric Company mixed in per hundred parts of total mixture.
(2) = parts of 70/30 by weight mixture of FC-12/FC-11 mixed in per hundred parts of polymer.
(3) = gap of die opening in millimeters at which samples were taken.
(4), (5) = pressure in kilograms per square centimeter at the die and at the extruder discharge respectively.
(6), (7) = thickness and width of foam body in centimeters measured within about five minutes after extrusion.
(8) = density of foam body in kilograms per cubic meter determined after aging for about six months.
(9) = cell size in millimeters determined per ASTM D-3576.
(10) = open cell content in percent determined per ASTM D-2856-A.
(11) = appearance of foam body; Y = yes, the foam shows one or more signs of prefoaming such as rough skin, chips and voids, N = no, no prefoaming. V = verge of prefoaming.
(12) = the behavior of extrudate; U = unstable flow showing waviness in the extrusion direction, S = stable flow.

TABLE IB

| Test NO. | Expansion Aid Level (1) | Initial Expansion Ratio (2) | Expansion In Steam (3) | | | | max. (4) | max. time (5) | Expansion In Hot Air (6) | | | |
|---|---|---|---|---|---|---|---|---|---|---|---|---|
|   |   |   | 10 sec | 1 min | 10 min | 1 hr |   |   | 90° C. | 100° C. | 110° C. | 120° C. |
| 1 | 2 | 30 | 61 | 130 | 217 | 243 | 243 | 1 hr | 39 | 45 | 52 | 11 |
| 2 | 5 | 24 | 61 | 125 | 160 | 214 | 214 | 1 hr | 32 | 36 | 43 | 9.8 |
| 3 | 10 | 28 | 62 | 105 | 182 | 169 | 174 | 15 min | 36 | 41 | 44 | 12 |
| 4 | 20 | 28 | 56 | 99 | 142 | 107 | 166 | 7 min | 34 | 41 | 48 | 12 |
| 5 | 50 | 29 | 54 | 89 | 118 | 78 | 133 | 5 min | 36 | 40 | 47 | 11 |

(1) parts of NORYL FN-215 made by General Electric Company mixed in per hundred parts of polymer.
(2) expansion ratio (specific foam volume divided by specific polymer volume) determined prior to steam expansion tests.
(3) expansion ratio of foam body determined in six days after expansion in steam for the given period of time. The steam expansion tests were conducted with foams aged for about a week.
(4) maximum expansion ratio of foam body after expansion in steam.
(5) steam exposure time corresponding to the maximum expansion ratio.
(6) expansion ratio of foam body after exposure to hot air at the specified temperature for one hour. The hot air expansion tests were conducted with foams aged for about six months.

The polystyrene foam compositions show similar faster and greater expansions in hot air even after aging for six months. The effects of the expansion aid on secondary expansions appear to peak at a 2% level and diminish gradually. The effect almost disappears at 50% in steam expansion tests. The results of these tests clearly demonstrate that a small amount of an expansion aid including a polyphenylene ether aids in extrusion and secondary expansions of extruded foams.

EXAMPLE 2

The apparatus and the base polystyrene used in this example were the same as in Example 1. An "S" shaped die orifice is attached at the discharge end of the extruder replacing the gap-adjustable die employed in Example 1.

A granular polystyrene is dry blended with an expansion aid comprising granular NORYL FN-215 at a predetermined ratio and fed into the extruder at a uniform rate of 4.54 kg (10 pounds) per hour. An 80/20 by weight mixture of trichloromonofluoromethane and normal pentane was injected into the extruder at an essentially uniform rate of about 0.59 kg (1.3 pounds) per hour. The extruder zones were maintained at 180°, 200° and 180° C. for feeding, melting and metering, and mixing zone respectively. The temperature of the cooling zone was adjusted so that the extrudate strand could become essentially free of voids upon quenching in cold water. The temperature of the gel exiting the die was in the range of 136°±2° C. The solid strand was cut into granules of about 0.64 cm in length. The granules were about 0.79 cm in width and 0.24 cm in thickness.

Three days later, the as-extruded expandable granules were annealed in 60° C. water for 35 minutes and aged for one day prior to steam expansions. The expandable polystyrene materials were expanded for 3 and 5 minutes in atmospheric steam and then aged for one day before the second expansions. The second steam expansions lasted for 3 minutes and third expansions for 2 minutes for all materials. Third expansions were conducted with one day-aged second expansion materials. The densities and expansion ratios were determined after the foams were aged for one day after each expansion.

The test results in Table II show the beneficial effect of the expansion aid on steam expansions of the expandable polystyrene materials. The materials containing 1, 2, and 3% by weight expansion aid all reached high levels of expansion. The benefits of the expansion aid are greater when the longer expansion time (5 min.) was employed for the first pass. Those compositions modified with a polyphenylene ether-containing expansion aid achieved high expansions exceeding about 100 independent of the expansion schedule. The composition of the present invention expanded to good-quality loose fill materials having few splits and cracks.

lapse and heat distortion temperatures) is a window or range within which the foam will undergo expansion without collapse.

Figure 2:
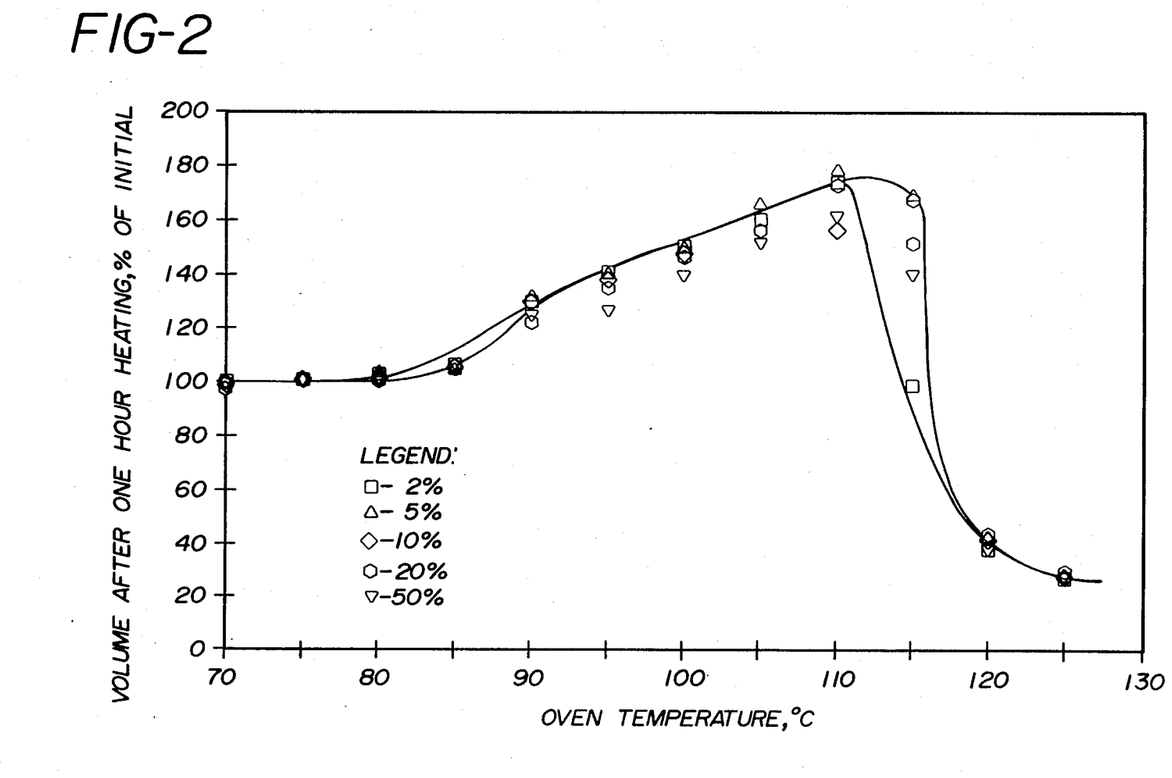
FIG. 2 is a graph illustrating expansion of a polystyrene foam with expansion aid in hot air to determine the range of temperatures in which such foam undergoes expansion without collapse based on data set forth in Table III.

As shown in Table III and FIG. 2, the collapse temperatures for the foam composition of the present invention were in the range of from about 110° to about 115° C. The heat distortion temperatures were in the range of from about 80° to about 85° C. Resultantly, the foam compositions of the present invention have a broadened transition temperature range of about 30° C. over which the composition may be expanded.

TABLE II

| Test No. | Expansion Aid Level (1) | 1st 3 min | 2nd 3 min (2) | 3rd 2 min | 1st 5 min | 2nd 3 min (3) | 3rd 2 min |
|---|---|---|---|---|---|---|---|
| 1 | 1 | 68 | 70 | 117 | 42 | 87 | 102 |
| 2 | 2 | 47 | 73 | 119 | 44 | 82 | 99 |
| 3 | 3 | 48 | 73 | 117 | 44 | 84 | 106 |

(1) Parts of NORYL FN-215 made by General Electric Company mixed in per hundred parts of total polymer mixture.
(2) Expansion ratio (specific foam volume divided by specific polymer volume) of foam body determined one day after each expansion for specified time in steam. In this series, the exposure time to steam was 3, 3 and 2 minutes for the first, second and third expansion, respectively.
(3) The same as (2) except that the exposure time to steam was 5, 3 and 2 minutes for the first, second and third expansion, respectively.

TABLE III

| Test No. | Expansion Aid Level (%) | Percent of Initial Volume after One Hour Aging at (°C.) | | | | | | | | | | |
|---|---|---|---|---|---|---|---|---|---|---|---|---|
| | | 70 | 75 | 80 | 85 | 90 | 95 | 100 | 105 | 110 | 115 | 120 | 125 |
| 1 | 2 | 100 | 101 | 101 | 106 | 130 | 141 | 150 | 160 | 173 | 98 | 37 | 26 |
| 2 | 5 | 100 | 100 | 101 | 103 | 132 | 140 | 150 | 166 | 178 | 169 | 41 | 26 |
| 3 | 10 | 100 | 100 | 102 | 106 | 129 | 137 | 148 | 152 | 157 | 167 | 42 | 27 |
| 4 | 20 | 101 | 100 | 103 | 106 | 122 | 135 | 146 | 156 | 172 | 151 | 43 | 29 |
| 5 | 50 | 100 | 100 | 102 | 106 | 124 | 126 | 139 | 151 | 161 | 139 | 38 | 26 |

EXAMPLE 3

An expansion test of a foam prepared in accordance with the procedure in Example 1 was carried out in hot air over a range of temperatures. The foam contained about 98% by weight of a polystyrene having a weight average molecular weight of about 200,000 and about 2% by weight of an expansion aid which comprised NORYL FN-215 resin produced by the General Electric Company. The foams were exposed to hot air at varying temperatures for a period of one hour and the percent of their initial volume was then determined.

The collapse temperature of each of the foams was evaluated. Collapse temperature is defined as the highest temperature where the foam loses no volume during the test. The heat distortion temperature of the foams was also determined. The heat distortion temperature is defined as the highest temperature at which the foam suffers no more than a five percent change in volume during the test. Between these two temperatures (col-

EXAMPLE 4

The apparatus used in this example included a ZSK-30 twin screw extruder manufactured by Werner Pfleiderer Corporation which was utilized to blend the expansion aid with the alkenyl aromatic resin component of the composition. The components were mixed on the extruder with the zones set at temperatures as high as 280° C. to insure adequate mixing. The blended components were then evaluated on the 1¼" extruder used in Example 1.

A granular polystyrene having a weight average molecular weight of about 200,000 was mixed with an expansion aid which comprised a NORYL 731 resin available from the General Electric Company. The NORYL 731 resin was analyzed to contain approximately 50% by weight poly(2,6-dimethyl-1,4-phenylene oxide) and 50% by weight HIPS. A small amount, 0.05 pph each, of barium stearate and talc were mixed in with the other components of the blend by using a small amount (0.1 pph) of wetting agent. The wetting agent was a 50/50 weight mixture of sucrose acetate isobutylate and diocytladipate. A 70/30 mixture of dichlorodifluoromethane (FC-12) and trichloromonofluoromethane (FC-11) was used as the blowing agent.

Reasonably good foams were achieved for blends containing up to 10% expansion aid. The foams were stored in a 0° C. freezer for one week and then aged at ambient temperature for one week prior to steam expansion tests. The results of the steam expansion tests are shown in Table IV below.

TABLE IV

| Test No. | Expansion Aid Level (1) | BA Level (2) | Gel Temp. (3) | Die Gap (4) | Die Press. (5) | Extrud. Press. (6) | Foam Dens. (7) | Cell Size (8) | Foam Density After Steam Expansion | | | | | min. time (11) |
|---|---|---|---|---|---|---|---|---|---|---|---|---|---|---|
| | | | | | | | | | 15 sec | 1 min | 10 min (9) | 1 hr | 2 hr | min (10) | |
| 1 | 1 | 14.5 | 127 | 0.76 | 52.7 | 67.5 | 40.5 | 0.21 | 21.0 | 13.4 | 9.6 | 7.4 | 6.2 | 6.2 | 2 hr |
| 2 | 2 | 15.3 | 127 | 0.76 | 58.3 | 77.3 | 37.3 | 0.22 | 20.0 | 15.8 | 11.0 | 8.2 | 7.2 | 7.2 | 2 hr |
| 3 | 2 | 16.3 | 134 | 0.76 | 52.0 | 69.6 | 36.3 | 0.21 | 19.7 | 11.4 | 9.9 | 8.2 | 8.6 | 8.2 | 1 hr |
| 4 | 2 TPP 0.2 | 15.4 | 134 | 0.76 | 54.8 | 66.8 | 33.3 | 0.22 | 18.6 | 11.5 | 7.4 | 5.9 | 5.9 | 5.9 | 1 hr |
| 5 | 5 | 15.1 | 134 | 0.76 | 59.8 | 76.6 | 39.7 | 0.22 | 23.4 | 15.2 | 11.5 | 10.7 | 9.1 | 8.8 | 30 m |

TABLE IV-continued

| Test No. | Expansion Aid Level (1) | BA Level (2) | Gel Temp. (3) | Die Gap (4) | Die Press. (5) | Extrud. Press. (6) | Foam Dens. (7) | Cell Size (8) | Foam Density After Steam Expansion | | | | | | |
|---|---|---|---|---|---|---|---|---|---|---|---|---|---|---|---|
| | | | | | | | | | 15 sec | 1 min | 10 min (9) | 1 hr | 2 hr | min (10) | min. time (11) |
| 6 | 10 | 15.3 | 134 | 0.76 | 68.9 | 88.6 | 40.3 | 0.32 | 20.2 | 14.6 | 10.7 | 9.6 | 9.1 | 8.3 | 2 hr |

(1) Parts of Noryl 731 made by General Electric Company mixed in per hundred parts of total mixture. In Test No. 4, triphenyl phosphate (TPP) was also added as indicated.
(2) Parts of 70/30:FC-12/FC-11 blowing agent mixed in per hundred parts of polymer.
(3) Temperature of polymer gel in degrees Centigrade.
(4) Gap of die opening in millimeters at which samples were taken.
(5), (6) Pressure in kilograms per square centimeter at the die and at the extruder discharge, respectively.
(7) Density of foam body in kilograms per cubic meter determined after aging in a 0° C. freezer for about a week.
(8) Average cell size in millimeters determined per ASTM D-3576.
(9) Density of foam body in kilograms per cubic meter determined two days after steam expansion for the specified period.
(10) Minimum foam density in kilograms per cubic meter achieved by steam expansion.
(11) Steam time that lead to minimum foam density.

As can be seen, the stiffening effect of the polyphenylene ether constituent of the expansion aid on the polymer blend is evident from the increase in line pressure. Triphenyl phosphate (TPP) when added to the blend, where indicated, has a plasticizing effect, aiding in steam expansion to lower densities.

Having described the invention in detail and by reference to preferred embodiments thereof, it will be apparent that modifications and variations are possible without departing from the scope of the invention defined in the appended claims.

What is claimed is:

1. A process for the preparation of an expanded polymeric foam composition comprising the steps of:
   (a) melt processing under pressure at least 50% by weight of an alkenyl aromatic polymer together with a volatile blowing agent and an expansion aid to form a flowable admixture, said expansion aid comprising from about 0.06% to about 15.0% by weight polyphenylene ether,
   (b) extruding said admixture through a die to a zone of lower pressure and activating said blowing agent to expand said alkenyl aromatic polymer to a cellular structure, and
   (c) exposing said cellular structure to steam or hot air at a temperature of between about 80° to about 115° C. to expand further said cellular structure to a foam having a lower density.

2. The process of claim 1 in which said alkenyl aromatic polymer is polystyrene.

3. The process of claim 1 in which said expansion aid further comprises from about 0.11% to about 27.5% by weight rubber-containing polystyrene and from about 0.03% to about 7.5% by weight aromatic phosphate.

4. The process of claim 1 in which said foam has a final density of between about 2.0 to about 16.0 kg/m$^3$.

5. A process for the preparation of an expanded polymeric foam composition comprising the steps of:
   (a) impregnating a volatile blowing agent into a blend of at least 50% by weight of an alkenyl aromatic polymer and an expansion aid comprising from about 0.06% to about 15.0% by weight polyphenylene ether,
   (b) heating said blend to activate said volatile blowing agent and expand said blend to a cellular structure, and
   (c) exposing said cellular structure to steam or hot air at a temperature of between about 80° C. to about 115° C. to expand further said cellular structure to a foam of lower density.

6. The process of claim 5 in which steps (b) and (c) occur substantially simultaneously and said steam or hot air supplies the necessary heat to activate said volatile blowing agent.

7. The process of claim 5 in which said alkenyl aromatic polymer is polystyrene.

8. The process of claim 5 in which said expansion aid further comprises from about 0.11% to about 27.5% by weight rubber-containing polystyrene and from about 0.03% to about 7.5% by weight aromatic phosphate.

9. The process of claim 5 in which said foam has a final density of between about 2.0 to about 16.0 kg/m$^3$.

* * * * *

UNITED STATES PATENT AND TRADEMARK OFFICE
CERTIFICATE OF CORRECTION

PATENT NO. : 4,661,302

DATED : April 28, 1987

INVENTOR(S) : Chung P. Park

It is certified that error appears in the above-identified patent and that said Letters Patent is hereby corrected as shown below:

Column 1, line 41, "may" should correctly appear as --must--.

Column 2, line 9, "constitutent" should correctly appear as --constituent--.

Column 2, line 35, "stream" should correctly appear as --steam--.

Column 3, line 5, "polphenylene" should correctly appear as --polyphenylene--.

Column 4, line 4, "incude" should correctly appear as --include--.

Column 4, line 26, "2,6-dimethy-" should correctly appear as --2,6-dimethyl--.

Column 5, line 7, "PN-215" should correctly appear as --PFN-215--.

Column 5, line 15, "extention" should correctly appear as --extension--.

Column 6, line 7, "PN-215" should correctly appear as --PFN-215--.

Column 6, line 38, "than a 70" should correctly appear as --than about a 70--.

Column 10, line 5, "composition" should correctly appear as --compositions--.

UNITED STATES PATENT AND TRADEMARK OFFICE
CERTIFICATE OF CORRECTION

PATENT NO. : 4,661,302

DATED : April 28, 1987

INVENTOR(S) : Chung P. Park

It is certified that error appears in the above-identified patent and that said Letters Patent is hereby corrected as shown below:

Column 10, line 45, " a 50/50 weight" should correctly appear as
--a 50/50 by weight--.

Column 10, line 46, "diocytladipate" should correctly appear as
--dioctyladipate--.

Signed and Sealed this

Twenty-seventh Day of March, 1990

Attest:

JEFFREY M. SAMUELS

Attesting Officer

Acting Commissioner of Patents and Trademarks